Figure 1:
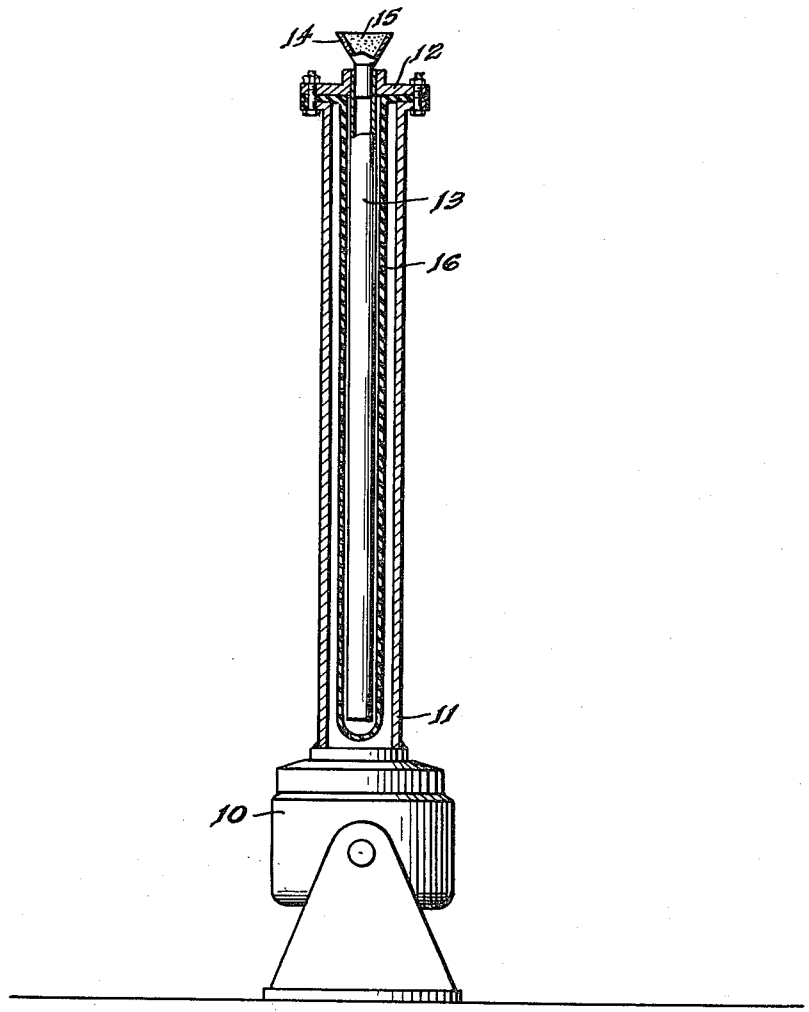

July 21, 1964

J. J. HAUTH 3,141,911

PROCESS FOR THE FABRICATION OF NUCLEAR FUEL ELEMENTS

Filed March 20, 1963

3 Sheets-Sheet 1

INVENTOR.
Joseph J. Hauth
BY
Roland A. Anderson
Attorney

July 21, 1964

J. J. HAUTH 3,141,911

PROCESS FOR THE FABRICATION OF NUCLEAR FUEL ELEMENTS

Filed March 20, 1963

3 Sheets-Sheet 2

INVENTOR.
Joseph J. Hauth
BY
Roland A. Anderson
Attorney

July 21, 1964  J. J. HAUTH  3,141,911
PROCESS FOR THE FABRICATION OF NUCLEAR FUEL ELEMENTS
Filed March 20, 1963  3 Sheets-Sheet 3

INVENTOR.
Joseph J. Hauth.
BY
Attorney.

United States Patent Office 3,141,911
Patented July 21, 1964

3,141,911
PROCESS FOR THE FABRICATION OF NUCLEAR FUEL ELEMENTS
Joseph J. Hauth, Richland, Wash., assignor to the United States of America as represented by the United States Atomic Energy Commission
Filed Mar. 20, 1963, Ser. No. 266,766
7 Claims. (Cl. 264—69)

This invention deals with the fabrication of fuel elements for nuclear reactors, and in particular with that of so-called ceramic-type fuel elements, which are fuel elements having a core of compacted refractory powder of fissionable materials, such as uranium oxide, plutonium oxide, thorium oxide, uranium carbide and mixtures thereof, and a cladding, jacket or tubing of a corrosion-resistant metal therearound.

In fuel elements of the type just described, it is highly desirable that the core be of the greatest possible density, so that a great amount of fuel can be packed in a given volume. Moreover, dense fuel has a better heat conductivity, a better retention for fission products and a greater stability at the relatively high operating temperatures of the nuclear reactor than does a more loosely packed fuel.

It was found previously that good compaction of ceramic fuel powder in a corrosion-resistant tube could be obtained by subjecting the powder to vibrations of varying frequencies, including resonant frequencies and frequencies harmonic therewith, and by repeating the sweep over the frequency range for a number of times. This process is the subject matter of applicant's U.S. Patent No. 3,042,594, granted on July 3, 1962. For this patented process the metal tubes filled with fuel powder were inserted vertically with their closed ends in a vibrator, as is customary in the art; the vibrations thus were immediately applied to the lower closed ends of the fuel tubes.

It is an object of this invention to provide a process for compacting powder encased in metal tubes by which an improved and more uniform density is obtained than in the process previously used.

It is also an object of this invention to provide a process for compacting powder encased in metal tubes by which the density of the powder can be increased more easily than by the process previously used.

It is another object of this invention to provide a process for compacting radioactive powder in a metal tube which can be operated by remote control so that personnel hazard is eliminated.

It is a further object of this invention to provide a process for compacting powder in metal tubes by mechanical vibration in which a plurality of tubes can be treated simultaneously with one vibrator so that an increased capacity and output are achieved with a given apparatus.

It is finally also an object of this invention to provide a process for compacting nuclear fuel powder in metal tubes by mechanical vibration wherein the fuel is contained within the tube and shielding requirements are thus reduced to a minimum.

It has been found that the results of the patented process described above using resonance vibration are greatly improved if the vibrations are applied, instead of to the lower closed end, to the upper open end of the fuel tube containing the fuel powder or particles while the tube is vertically suspended at its upper end. It is believed that the improvement is due, at least partly, to the fact that the vibrations, when transferred to the upper part of the tube which is either empty or contains the powder in a relatively loose arrangement, are damped less than when they are introduced into the lower zone of the tube where the powder has been compacted.

The process of this invention thus comprises closing the bottom end of a tube; introducing powder through the upper open end of said tube until the tube is approximately filled; simultaneously applying vibrations, vertical or horizontal, of varying frequencies to said upper open end of said tube, said frequencies ranging from below-resonant, resonant to above-resonant and possibly including resonant-harmonic frequencies; repeating the sweep over said frequency range for a number of times; adding more fuel powder to fill the tube as the previously introduced powder becomes compacted and recedes from the upper end of the tube; and sealing the upper end of said tube.

The vibration frequency may vary widely, for instance from 180 to 2500 cycles per second; the range between 500 and 2500 cycles per second has been found best. Vertical and horizontal or lateral vibrations are operative. However, the latter have the additional advantages that they allow support of the lower end of the fuel element without any adverse effect on the compacting operation which in turn reduces stresses in the cladding tube at the point of coupling; this is particularly important in the case of thin-walled tubes, such as tubes of aluminum or stainless steel.

A number of devices can be used for the process of this invention. Three types of apparatus that have been used with particularly good results are diagrammatically illustrated in the accompanying drawings.

Referring to the apparatus shown in FIGURE 1, the reference numeral 10 indicates a vibrator which supports metal bars 11. A holding fixture or coupling 12 from which a tube 13 is suspended is arranged at the upper end of the metal bars 11; the lower end of tube 13 is closed, while its upper end is open and is rigidly connected with a feeding funnel 14. The funnel 14 is flexibly connected with a powder reservoir (not shown). The powder 15 to be compacted is shown in funnel 14. The numeral 16 indicates a flexible plastic tube that may be arranged around the fuel tube 13 to achieve containment of the powder if it is radioactive; it is securely positioned between the open end of the tube and the holding fixture 12. Instead of connecting one fuel tube with the bars 11 as shown, a plurality of tubes can be mounted thereto and processed simultaneously.

It will be obvious that the vibratons of vibrator 10 are directly transferred to the bars 11 from its lower end which, in turn, conveys them through its upper end and the holding fixture 12 to the upper end of tube 13. There are certain frequencies at which the bar resonates and other frequencies at which the fuel rod resonates. Thus there exist a number of resonant frequencies whereby the vibration energy is amplified.

Figure 2:
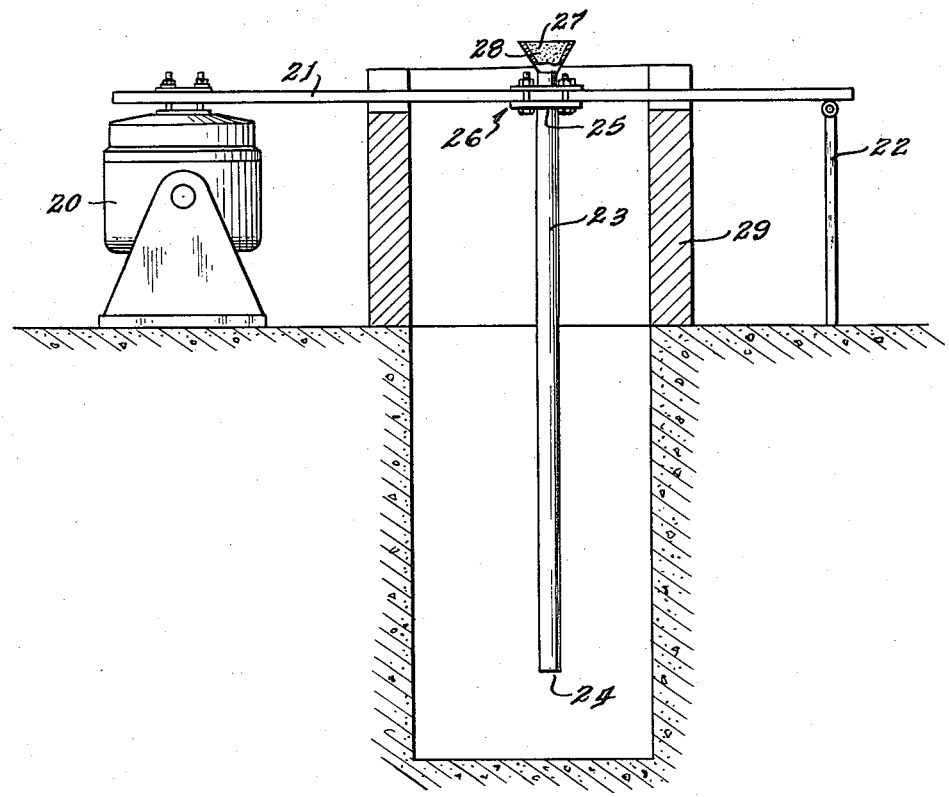

A still higher degree of amplification is obtained in the apparatus shown in FIGURE 2. There a vibrator 20 carries one end of a horizontal resonance beam 21; the other end of the beam is fulcrumed by means of a lever 22. A tube 23 having a closed bottom end 24 and an open top 25 is rigidly coupled by a suspending means 26 to the beam 21 at a position between vibrator 20 and lever 22. A funnel 27 which contains powder 28 is rigidly coupled, via the suspending means 26, with the upper open top end 25 of tube 23. Opening and closing of funnel 27 can be carried out by remote control in the case of radioactive powder. Like in the device of FIGURE 1, the fuel tube may be enclosed in a plastic bag (not shown) for containment of radioactivity. The upper end of funnel 27 is connected by a closed flexible means with a powder container (not shown). A completely closed feeding system is thus obtained which is easy to operate without there being any external contamination in the case of radioactive materials. A shield 29 is arranged around the rod to protect personnel from radioactivity. The vibrator is outside of the shield.

Instead of one tube as shown, a plurality of tubes can be attached to the beam and can be processed simultaneously by the same vibrator, since the weight of the tubes does not completely rest on the vibrator. Amplifications of the vibrations by the beam was illustrated by operating the vibrator at an acceleration of 60 $g$, which produced accelerations up to 1200 $g$ at the point of suspension of a 160-lb. fuel element.

In one instance a 1-foot long stainless steel tube was used on the apparatus of FIGURE 2 and uranium dioxide powder was introduced into said tube. Amplification of the vibrations by the beam at frequencies (greater than 1000 c.p.s.) corresponding to resonance in the short tube, produced a higher density than was previously achieved in tubes of this geometry. The powder after manual sweeping of frequencies from 500 to 2500 cycles per second had experienced a compaction efficiency (=bulk density÷particle density multiplied by 100) of 92%. Sealing of the top of the tubes can be accomplished by fusion welding of a closure thereto.

Figure 3:
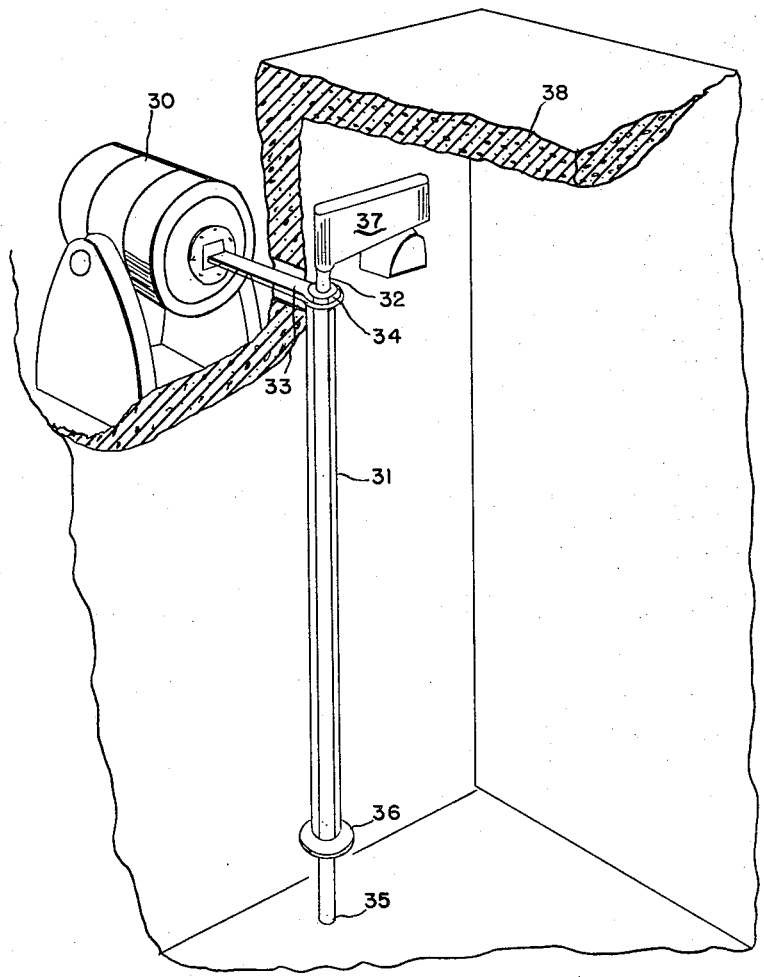

FIGURE 3 shows an arrangement for the very best embodiment of this invention, namely a device for applying lateral or horizontal vibrations to the fuel tube. There, a horizontally arranged vibrator 30 is connected with a cladding tube 31 at its open upper end 32 by means of a horizontally vibrating resonance beam 33 and coupling 34. The bottom end 35 of the tube 31 is closed; it carries an adjustable platform 36 by which the weight of the tube 31 can be supported during vibrations, and stress in the tube at the point of the coupling 34 can be prevented or considerably reduced. A fuel feeder 37 opens into the upper open end 32 of the tube 31. The numeral 38 designates the radiation shielding.

The process and apparatus of this invention can be used for the compaction of fresh nuclear fuel powders as well as for that of neutron-irradiated fuel that has been partially decontaminated by known processes. It is also applicable to the fabrication of nuclear control rods and of a variety of nonnuclear articles comprising various ceramic, metal and organic materials.

It will be understood that the invention is not to be limited to the details given herein but that it may be modified within the scope of the appended claims.

What is claimed is:

1. A process of fabricating metal-jacketed powder elements of great density, comprising providing a closed-end metal tube; introducing powder through the upper open end of said tube, until said tube is approximately filled; attaching a means of vibration to said upper open end of said tube; simultaneously applying vibrations of varying frequencies to said upper open end of said tube, whereby said vibrations travel down said tube, said frequencies ranging from below-resonant, resonant to above-resonant numbers of vibration; and adding more powder again to fill the tube as the previously introduced powder becomes compacted and recedes from the upper end of the tube.

2. The process of claim 1 wherein said vibrations are vertical.

3. The process of claim 1 wherein said vibrations are horizontal.

4. The process of claim 1 wherein the above-resonant frequencies include resonant harmonic frequencies.

5. The process of claim 1 wherein the sweep over the entire frequency range is repeated several times.

6. The process of claim 1 wherein the frequency sweep extends from 180 to 2500 cycles per second.

7. The process of claim 6 wherein the frequency sweep extends from 500 to 2500 cycles per second.

References Cited in the file of this patent

UNITED STATES PATENTS

| | | |
|---|---|---|
| 2,526,174 | Ukropina | Oct. 17, 1950 |
| 2,645,836 | Sorensen et al. | July 21, 1953 |
| 2,681,494 | Weber | June 22, 1954 |
| 2,882,582 | McLennan | Apr. 21, 1959 |
| 3,042,594 | Hauth | July 3, 1962 |
| 3,067,117 | Hauth | Dec. 4, 1962 |
| 3,102,850 | Ross | Sept. 3, 1963 |

OTHER REFERENCES

AEC document, NAA–SR–4155, October 1959.
AEC document, WADC–53–193, Pt. 3, December 1959.